March 30, 1954  G. G. OUTTERSON  2,673,603
SAFETY CONTROL FOR A COMBUSTION SYSTEM
Filed July 30, 1949  2 Sheets-Sheet 1

INVENTOR.
GEORGE G. OUTTERSON
BY
Campbell, Brumbaugh, Free & Graves
HIS ATTORNEYS

INVENTOR.
GEORGE G. OUTTERSON

Patented Mar. 30, 1954

2,673,603

UNITED STATES PATENT OFFICE 2,673,603

SAFETY CONTROL FOR A COMBUSTION SYSTEM

George G. Outterson, Mexico, N. Y.

Application July 30, 1949, Serial No. 107,735

5 Claims. (Cl. 158—28)

The present invention relates to control or programming systems for producing sequential operation of a plurality of elements of a device or a plurality of devices, such as oil or gas burners commonly used in household heating installations. It relates more particularly to an initiating circuit for the control system which sets into operation and controls the operation of fuel burners, and to safety mechanisms for assuring proper and safe operation of such fuel burners.

A domestic fuel burner of the type referred to generally above, such as an oil burner, may burn fuel at the rate of two to three gallons per hour and includes an air-supplying means and an oil-supplying means in a single unit, and a device for igniting the fuel. The usual control system for such burners includes a thermostat, aquastat or pressure limit switch, or any other pressure or temperature responsive device which is used to start or otherwise regulate the fuel burner.

In the use of existing devices of this general character, however, a relatively large number of switches and contact elements are required.

By virtue of the novel initiating circuit disclosed herein, low voltage initiating means are provided for a combustion system in which the failure of any one of its components to function or any of the components controlled thereby, prohibits continued operation of the system and assures, thereby, a safe programming sequence.

The present invention has, therefore, as a principal object, the provision of a low voltage initiating circuit and control for setting into operation and controlling the operation of the air and fuel supplying means and the igniting device in a combustion system.

A further and more general object of the invention is to provide a low voltage control circuit which is rendered safe when any of its component parts or the device controlled thereby fail to function properly.

The invention may best be understood from the following detailed description, taken in conjunction with the accompanying drawings in which.

Figure 1:
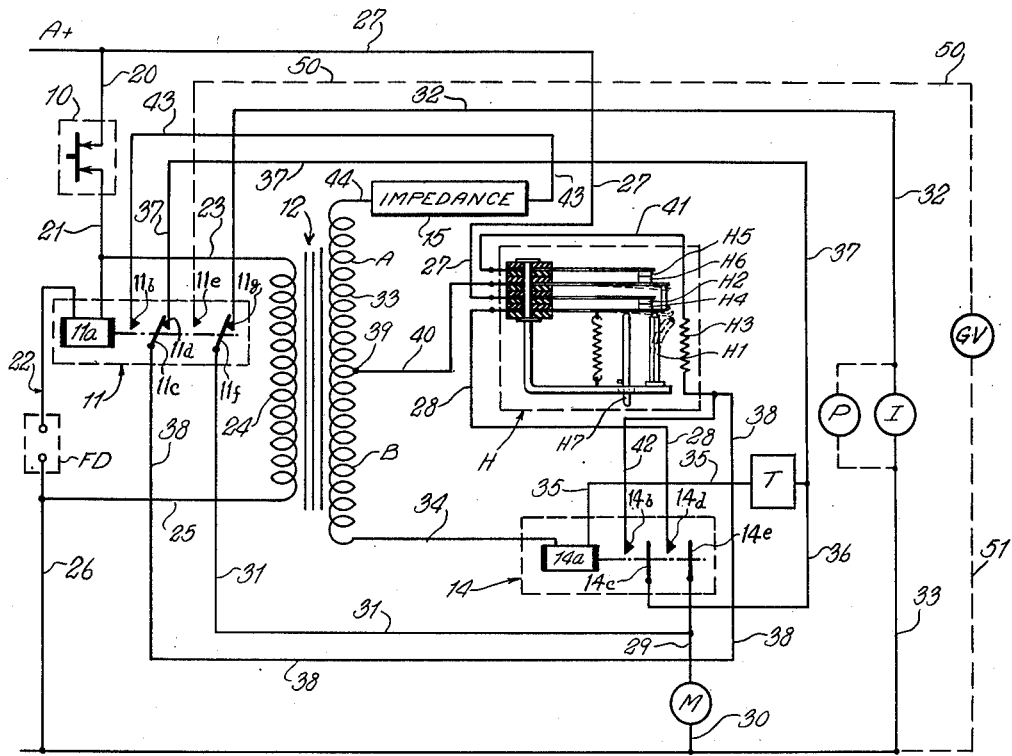
Fig. 1 is a schematic diagram of a typical control system for oil-fired or gas-fired fuel burners.

Referring now to Fig. 1, a circuit for an oil-fired or gas-fired fuel system is shown which may include a double contact manually operated switch 10; a step-down transformer 12; a control switch T which, for example, may be a pressure controlled switch, aquastat or thermostat; a relay 11 having a relay coil 11a, and normally open contacts 11b—11c, and 11e—11f and normally closed contacts 11c—11d; and a flame detector mechanism FD which in a typical embodiment may include a metal helix actuated by heat or an electric eye or electric prober, or any device which can perform a switch operation upon the presence of flame in the burner. The operation of relay 11, described above, is controlled by flame detector mechanism FD. The system also includes an impedance 15 and a relay 14 having a relay coil 14a and normally open contacts 14b—14c and 14d—14e. A thermal switch or other electrically responsive device member H is provided which may include a conventional bi-metallic warp element H1 actuated by a heater coil H3 for causing normally closed contacts H2—H4 and H5—H6 to open. A manual reset control H7 is provided for closing the contacts once they have opened.

Fuel under pressure may be supplied to the burner (not shown) by gravity, line pressure or by a pump actuated by motor M. The ignition of the combustible mixture is initiated by an igniting device I. For gas operation, a gas pilot P is provided, as well as a gas valve GV to control the flow of fuel to the burner.

The system is connected to the power lines A+ and A— which supply suitable operating voltage. The power line A+, as illustrated, is connected to one contact of switch 10 by conductor 20, and by means of conductor 21 to the relay coil 11a of relay 11, the latter being connected by conductor 22 to the flame detector mechanism FD. Conductor 23 connects to conductor 21 and completes a circuit through the primary winding 24 of transformer 12, and through conductor 25 to conductor 26 which connects the flame detector mechanism FD to the power line A—. The power line A+ is also connected by means of conductor 27 normally closed contacts H2—H4 of the thermal switch member H, and conductor 28 to the normally open contacts 14d—14e of relay 14, the latter contact being connected by conductor 29 to the motor M. Motor M connects the power line A— by means of conductor 30. From conductor 29, a conductor 31 connects the normally closed contacts 11f—11g of relay 11, conductor 32, the igniting device I and the conductor 33 to power line A—.

A secondary winding 33 of transformer 12 connects by means of conductor 34 to relay coil 14a of relay 14 and then to control switch T by means of conductor 35, the latter connecting by means of conductor 36 to contact 14c of relay 14. Control switch T also connects through conductor 37 to contact 11d of relay 11, cooperating contact 11c thereof connecting by means of conductor 38 to heater coil H3 of thermal switch H. A center tap 39 on the secondary winding 33 of transformer 12 is connected to the normally closed contacts H6—H5 of heater H through conductor 40, the contact H5 being connected to the heater coil H3 by means of conductor 41. Contact 14b of relay 14 connects to conductor 38 through conductor 42. Contact 11b of relay 11 is connected to the secondary winding 33 of transformer 12 through a circuit including conductor 43, the impedance 15 and a conductor 44. It will be seen that the low voltage circuit, including a section A of the secondary transformer coil 33, the impedance 15, the relay coil 14a and a section B of the transformer coil 33, comprises a bridge, across which is disposed the heater element H3.

Assume now that switch 10 is closed so that the above described system is in an operative condition and a circuit is completed through conductor 20, conductor 21, conductor 23, the primary winding 24 of the transformer 12, conductor 25 and conductor 26 to the power line A—. Also assume that the burner is not in operation and that when the boiler pressure, water or room temperature reaches the desired lower value the control switch T calls for heat.

Thus, when control switch T is actuated, a circuit is completed through conductor 35, relay coil 14a of relay 14, conductor 34, the secondary winding 33 of transformer 12 to the center tap 39 thereof, conductor 40, the normally closed contacts H6—H5 of thermal switch H, conductor 41, heater coil H3 of thermal switch H, and through conductor 38, to the closed contacts 11c—11d of relay 11 and conductor 37, back to the control switch T. A circuit is then completed, by the closing of contacts 14b—14c of the now energized relay 14, through conductor 42 to closed contacts 14b—14c of relay 14, and conductor 36 to the control switch T. Contacts 14b—14c of relay 14 closed when the relay coil 14a became energized; contacts 14d—14e thereof also closed. Thus, the circuit was completed from the power line A+ through conductor 27, the closed contacts H2—H4 of thermal switch H, conductor 28, conductor 29, motor M and conductor 30 to the power line A—. When motor M becomes energized, the air and fuel supplying means are set into operation, and simultaneously a circuit is completed through conductor 31, contacts 11f—11g of relay 11, conductor 32, the igniting device I and conductor 33 to the power line A—. As a result, the oil will be ignited in normal operation.

When flame is detected by flame detector mechanism FD a circuit is completed from the already energized conductor 21 through relay coil 11a of relay 11, conductor 22 and conductor 26 to the power line A—. When the relay coil 11a becomes energized contacts 11d—11c and contacts 11g—11f thereof open and contacts 11b—11c are closed. When contact 11c—11d opens, the circuit through 11f—11g is open, and the circuit through contacts 14b—14c of relay 14 is maintained as a holding circuit, a new circuit being completed through conductor 43, the impedance 15 and conductor 44 of the secondary winding 33 of transformer 12.

Thus, in normal operation the low voltage circuit, after combustion occurs will be in the form of an impedance bridge network which comprises a coil section A of secondary winding 33 of transformer 12, conductor 44, impedance 15 to conductor 43, contacts 11b—11c of relay 11, conductor 38, conductor 42, contacts 14b—14c of relay 14, conductor 36, control switch T, conductor 35, relay coil 14a of relay 14, conductor 34 and a coil section B of the secondary winding 33 of transformer 12. Thus, it is seen that a bridge circuit is formed and when the ratio of the voltages induced in coil section A and coil section B of the secondary winding 33 of transformer 12 is equal to the ratio of the impedance 15 to that of relay coil 14a, no current can flow through the heating element H3 of thermal switch H.

When the heating demands are satisfied, control switch T is disconnected and the circuit through conductor 35, relay coil 14a of relay 14, conductor 34, the secondary winding 33 of transformer 12, conductor 44, impedance 14, conductor 43, contacts 11b—11c of relay 11, conductor 38, conductor 42, contacts 14b—14c of relay 14 and conductor 36 is broken. Since relay coil 14a is deenergized contacts 14b—14c and 14d—14e thereof open. When contacts 14d—14e open, the circuit through motor M supplying the fuel and air to the system is disconnected. As a result, flame is no longer detected and the circuit through the relay coil 11a of relay 11 is disconnected and contacts 11b—11c open and contacts 11c—11d and 11f—11g close. As a result, the system is returned to its normal non-operating condition.

In the case of failure of any of the components of the combustion system the sequence is as follows:

1. If the flame fails during the programming sequence, the circuit through the relay coil 11a of relay 11 is broken and the contacts 11b—11c thereof open and contacts 11c—11d and 11f—11g close. As control switch T is still calling for heat and the circuit through the relay coil 14a of relay 14 is still energized, contacts 11d—11e thereof remain closed and the motor M continues to operate. Since contacts 11f—11g are now closed and a circuit is completed through the igniting device I, the system may again be set into operation, as described above.

However, as the circuit from contacts 14b—14c of relay 14 is completed therefrom through conductor 36, control switch T, conductor 35, relay coil 14a of relay 14, conductor 34, the secondary winding 33 of transformer 12, mid-tap 39, conductor 40, closed contacts H6—H5 of thermal switch H, conductor 41, heater coil H3 of thermal switch H, conductor 38 and conductor 42, a circuit is also completed from heater coil H3 of thermal switch H through conductor 38, contacts 11c—11d, now closed, of relay 11 and conductor 37 of the control switch T.

If the flame is not detected within the arbitrary period of time, current will continue to surge through heater coil H3 of thermal switch H resulting in the opening of closed contacts H2—H4 and H5—H6 which are controlled thereby. If this occurs, the motor M turns off and the above described initiating circuit is broken and the system is inoperative.

2. In case of ignition failure, the same sequence of events described above in connection with flame failure takes place. Coil 11a of relay 11 is not energized and its respective contacts remain in their normal inoperative position, and as heater coil H3 of thermal switch H has current flowing therethrough, contacts H2—H4 and H5—H6 thereof open, and system becomes inoperative, as explained.

The elements comprising the initiating circuit are being individually tested during operation as to continuity, as described below:

1. First the heater coil H3 of thermal switch H is tested when the system is initially set into operation.
2. The closing of contacts 14b—14c of relay 14 tests the energizing of relay coil 14a.
3. The impedance 15 is being tested continually inasmuch as if the circuit therethrough is broken, the heater coil H3 of thermal switch H will heat up and open its respective contacts.
4. The coil sections A and B which are formed by the center tapping of the secondary winding 33 of transformer 12 are being tested through the impedance ratio set forth above. If a coil in either coil sections A or B is shorted, unbalance will result in the circuit and the closed contacts H2—H4 and H5—H6 of thermal switch H will be opened through the heating of contact of heater coil H3.

If there is erratic operation of relay 11 during a shut-down period, such as contact 11b—11c of relay 11 remaining closed instead of open, the circuit will be completed through the impedance cross section A of the secondary winding 33 of transformer 12, the closed contacts H2—H4 of thermal switch H and the heater coil H3 thereof. Thus, once again the heater will heat up and its respective contacts will open and system will be in an inoperative condition.

If control switch T opens and relay 14 does not operate, the circuit is still continued through the motor M. The fuel is still ignited and relay coil 11a of relay 11 is energized. The initiating circuit is completed through the impedance 15, the coil section A of the secondary winding 33 of transformer 12, contact H2—H4 and heater coil H3 of thermal switch H and contact 11b—11c of relay 11. One arm of the bridge circuit is disconnected, and through continued heating of header coil H3 of thermal switch H, the respective contacts thereof open and the system in inoperative.

For use in a gas embodiment, the circuit in the drawing is modified as shown by broken lines. A conductor 50 connects the contacts 11e—11f of relay 11 to gas valve GV, the latter connecting to the power lines A— by means of conductor 51. It should be noted that contacts 11e—11f and contacts 11g—11f comprise a single-pole double-throw switch. The circuit is further modified by utilizing a pilot P in parallel with the igniting device I.

The operation of this form of the invention is similar to that described in connection with the oil fired system. The same sequence of operations is followed and the same safety features are assured in this case. The system of the invention may be used as an integral part of a larger or more comprehensive sequencing system, which may include other timing means but in which the system of the invention acts to perform the safety functions described herein.

From the foregoing description it should be apparent that the present invention typifies a low voltage initiating circuit which insures a safe programming sequence. The system is susceptible of considerable change in the type of heating device controlled thereby and the type of flame detector used therein. The coil sections A and B of the secondary winding 33 of transformer 12 may be any suitable voltage inducing means. Furthermore, it is apparent that impedance 15 and coil sections A and B may vary within predetermined limits and still assure this safe programming of the system.

Figure 2:
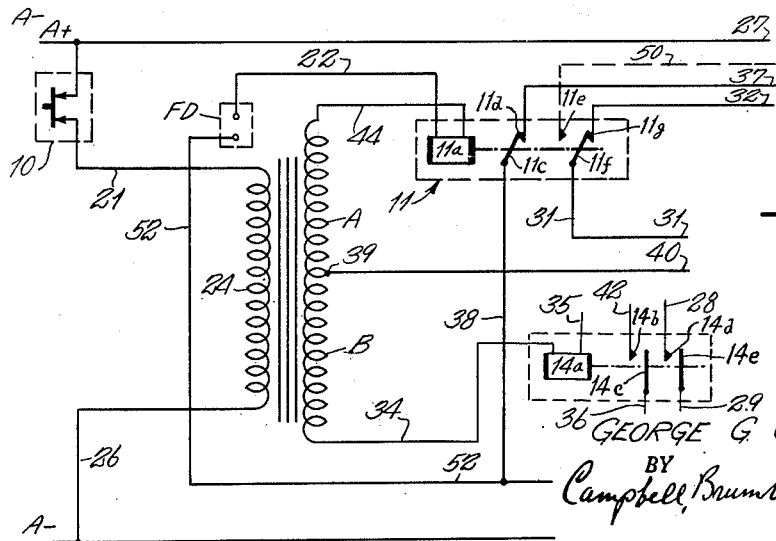
Fig. 2 is a schematic diagram showing a modification of the control circuit shown in Fig. 1.
Figure 3:
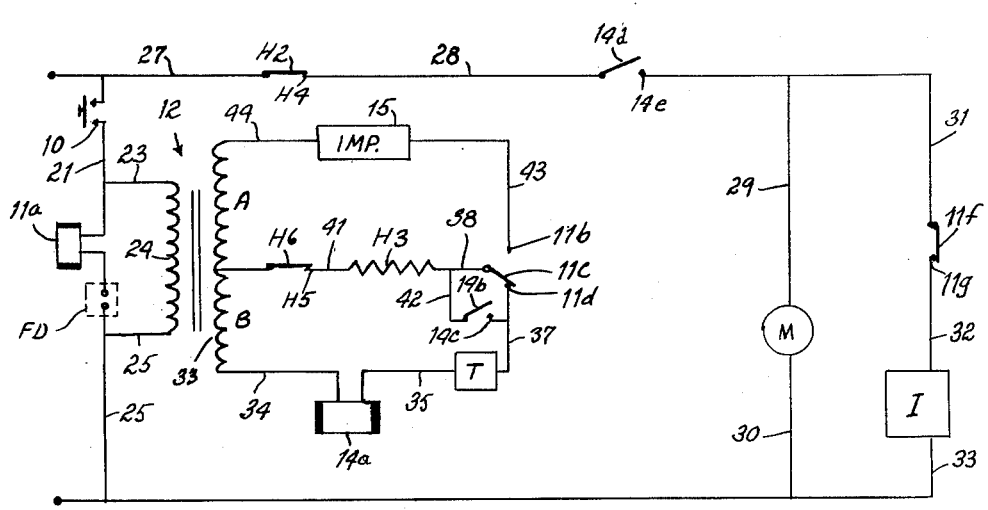
Fig. 3 is a simplified schematic diagram of the control circuit of Fig. 1.
Figure 4:
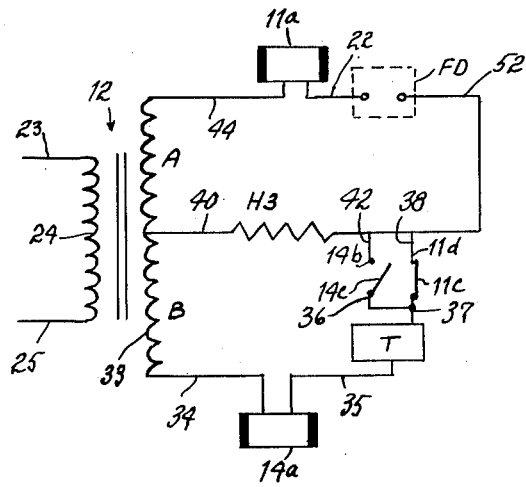
Fig. 4 is a simplified schematic diagram of a portion of the control circuit of Fig. 2.

According to the invention, numerous modifications of the circuits shown in Fig. 1 may be provided. For example, in Fig. 2, is shown one preferred modification in which the impedance 15 is replaced in the circuit by the relay coil 11a of the relay 11. The relay coil 11a is thus connected as one leg of the bridge to balance out the relay coil 14a so as to prevent a flow of current through the heater element H3 when the relays 11 and 14 are energized.

The bridge circuit in Fig. 2 thus includes the section A of the secondary transformer coil 33, the relay coil 11a, the relay coil 14a and the section B of the transformer secondary 33. The flame detector FD is connected in series with the relay coil 11a through a circuit including conductors 22 and 52, the latter joining the conductor 38 which leads to the heater element H3 as described. With the exception of the addition of the conductor 52, the substitution of the relay coil 11a for the impedance 15, and the elimination of the stationary relay contact 11b (with its conductor 43) and the heater switch contacts H5 and H6, the circuits of Fig. 2 are the same as those described in conjunction with Fig. 1, with like components being identified with like reference characters. The operational sequences and principles of operation are not changed.

The above description should be considered as illustrative of the invention and not as limiting the scope of the following claims.

I claim:

1. In a programming and control system for fuel burners having electrically controlled air and fuel supplying means and ignition means, the combination of terminal means across which an AC potential is to be impressed, a transformer having a primary winding electrically connected across said terminal means, said transformer having a low voltage secondary winding formed with a mid-tap, impedance means connected to one end of said secondary winding, a first relay coil, a first initially open switch controlled by the coil and a thermostat switch connected as a series circuit to the other end of the secondary winding, electrical connections adapted to join the series circuit to the impedance means to form a junction and including a second initially open switch connected in series with said impedance means, the impedance of said relay coil and said impedance being equal as a ratio to the ratio of the voltages induced in the two halves of the secondary winding whereby, when the first and second switches are closed, said secondary winding, impedance means, relay coil and thermostat switch form a bridge circuit normally balanced with null points at said mid-tap and said junction, current responsive means connected across said junction and mid-tap, said current responsive means being operative after a preestablished time interval of unbalance of said bridge network, means including a third initially closed switch connected in shunt across said first switch, a second relay coil and combustion responsive means for energizing the second relay coil, said second switch being adapted to be closed and said third switch being adapted to be opened by said second relay coil, said electrically controlled fuel supplying and ignition means being connected to be energized by the voltage across said terminals, and fourth and fifth switches connected in series with said fuel supplying and ignition means, said fourth switch comprising an initially open switch controlled by said first relay coil, and said fifth switch comprising an initially closed switch controlled by said current responsive means, whereby the fifth switch is opened after a preestablished time interval of unbalance of the bridge network.

2. A system as set forth in claim 1 said fuel-supplying and ignition means including an electric motor and an ignition device connected in shunt across said terminal means, and a sixth initially closed switch connected in series with said ignition means and adapted to be opened by said second relay coil.

3. In a programming and control system for a fuel burner having electrically controlled fuel-supplying means, electrical circuit means for connecting the fuel-supplying means to a source of electrical energy, a transformer having primary winding means adapted to be connected to an AC source and secondary winding means divided into first and second parts, first impedance means connected to one end of the secondary winding means, second impedance means connected to the other end of the secondary winding means, electrical connections joining the first and second impedance means to form together with the secondary winding means an impedance bridge network, the first and second arms of which include, respectively, the first part of the secondary winding means and the first impedance means, and the third and fourth arms of which include, respectively, the second part of the secondary winding means and the second impedance means, said bridge network having a pair of reference points having a preestablished voltage relationship during normal operation, the first reference point being between the secondary winding parts and the second being between the first and second impedance means, a bridge diagonal connecting the reference points and including an electrically responsive switch-controlling device responsive to voltage relationships differing from the said preestablished relationship, an initially closed first switch adapted to be opened by said device upon a current flow of a preestablished time duration through the bridge diagonal, circuit means connecting said first switch in series with said fuel-supplying means and said source of electrical energy, an initially closed second switch in said third and fourth arms of the bridge network, a flame detector connected to a source of electrical energy and responsive to the presence of combustion at the said fuel burner to complete an electrical circuit, means responsive to a flow of current in the circuit to open the second switch, an initially open third switch connected in said third and fourth arms of the bridge network shunting the second switch, said second impedance means including a first relay coil adapted to close said third switch in response to a flow of current therein, a thermostat switch conected in series with the third and fourth arms of the bridge network and in series with the second and third switches, and an initially open fourth switch connected in series with the first switch and fuel-supplying means and adapted to be closed in response to a flow of current in the said first relay coil.

4. A system as set forth in claim 3, wherein said flame detector is connected in series in said first and second arms of the bridge and said first impedance comprises a second relay coil adapted upon energization, to open said initially closed second switch, whereby the flame detector in response to combustion at the fuel burner establishes the bridge network.

5. A system as set forth in claim 3, an ignition device connected in parallel with said fuel-supplying means, and an initially closed fifth switch connected in series with said ignition means and adapted to be opened by said means responsive to a flow of electrical current in the said electrical circuit completed by said flame detector in response to combustion at the fuel burner.

GEORGE G. OUTTERSON.

References Cited in the file of this patent
UNITED STATES PATENTS

| Number | Name | Date |
|---|---|---|
| 2,086,823 | Shaw | July 13, 1937 |
| 2,102,691 | Francis | Dec. 21, 1937 |
| 2,139,504 | King | Dec. 6, 1938 |
| 2,338,786 | Sparrow | Jan. 11, 1944 |
| 2,380,125 | Strobel | July 10, 1945 |
| 2,397,704 | Strobel | Apr. 2, 1946 |
| 2,420,578 | Wilson | May 13, 1947 |
| 2,490,534 | Mesh | Dec. 6, 1949 |